United States Patent [19]
Tanaka

[11] Patent Number: 5,391,113
[45] Date of Patent: Feb. 21, 1995

[54] IMPACT ABSORBING STEERING SHAFT COMPRISING A PRESS-WORKED HOLLOW METAL PIPE

[76] Inventor: Takeru Tanaka, 1-3-18, Minamishimizu-cho, Sakai-shi, Osaka-pref, Japan

[21] Appl. No.: 33,946
[22] Filed: Feb. 16, 1993

Related U.S. Application Data

[63] Continuation of Ser. No. 739,709, Aug. 5, 1991, abandoned.

[51] Int. Cl.$^6$ ............................................. F16C 3/03
[52] U.S. Cl. ........................................ 464/91; 74/492; 464/162
[58] Field of Search .................. 464/91, 162, 182, 183; 74/492; 280/777, 779

[56] References Cited

U.S. PATENT DOCUMENTS

| | | | |
|---|---|---|---|
| 2,823,556 | 2/1958 | Cislo | 74/492 |
| 2,961,891 | 11/1960 | Sewelin | 280/779 X |
| 3,685,369 | 8/1972 | Adams, III | 74/492 |
| 4,014,219 | 3/1977 | Feustal et al. | 74/492 |
| 4,183,258 | 1/1980 | Stephan | 74/492 |
| 4,390,193 | 6/1983 | Strahan et al. | 74/492 X |
| 4,601,215 | 7/1986 | Barnabe et al. | 74/492 |
| 4,633,731 | 1/1987 | Kurata | 74/492 |
| 4,648,624 | 3/1987 | Mouhot et al. | 280/779 X |
| 4,738,154 | 4/1988 | Hancock | 74/492 |
| 4,862,761 | 9/1989 | Sander et al. | 74/492 |
| 5,088,768 | 2/1992 | Maruyama et al. | 280/779 X |
| 5,216,912 | 6/1993 | Tanaka | 72/367 |

Primary Examiner—Daniel P. Stodola
Assistant Examiner—Eileen A. Dunn
Attorney, Agent, or Firm—Moonray Kojima

[57] ABSTRACT

A steering shaft wherein energy absorbers are formed by filling a synthetic resin between the shaft and an outer sleeve. This steering shaft comprises a plastic metal pipe including, in a region remote from the steering wheel, a flat portion for connection to the outer sleeve, and a plurality of annular grooves to be filled with the synthetic resin. In a region adjacent the steering wheel, the plastic metal pipe includes an upper bearing mount, a screw for engaging a bearing retaining nut, a serrated shaft for engaging the steering wheel, and a screw for engaging a retainer nut, all defined as integral parts of the plastic metal pipe and arranged in the stated order toward an extreme end of the pipe. This steering shaft is lightweight, and may be manufactured in a reduced shaping time and at low cost.

2 Claims, 11 Drawing Sheets

IMPACT ABSORBING STEERING SHAFT COMPRISING A PRESS-WORKED HOLLOW METAL PIPE

This is a continuation of Ser. No. 07/739,709, filed Aug. 5, 1991, now abandoned.

SUMMARY OF THE INVENTION

This invention relates to a shock absorbing type steering shaft for steering front wheels of a vehicle by converting rotation of a steering wheel to reciprocation of a tie rod, and to a method of manufacturing the steering shaft.

The steering shaft has energy absorbers formed by filling a synthetic resin between the shaft and an outer sleeve. This steering shaft comprises a plastic metal pipe including, in a region remote from the steering wheel, a flat portion for torque transmission to the outer sleeve, and a plurality of annular grooves to be filled with the synthetic resin. In a region adjacent the steering wheel, the plastic metal pipe includes an upper bearing mount, a screw for engaging a bearing retaining nut, a serrated shaft for engaging the steering wheel, and a screw for engaging a retainer nut, all defined as integral parts of the plastic metal pipe and arranged in the stated order toward an extreme end of the pipe. This steering shaft is lightweight, and may be manufactured in a reduced shaping time and at low cost.

BACKGROUND OF THE INVENTION

Conventional steering, shafts include the following shock absorbing type steering shaft.

A steering shaft having a shock absorbing structure is formed of a solid round bar, and has a steering wheel connected to an upper end, and an outer sleeve connected to a lower end thereof. An energy absorber is formed between the solid bar steering shaft and outer sleeve by filling a synthetic resin into annular grooves defined on the shaft. The engagement structure consisting of the resin between the shaft and outer sleeve is broken upon collision of the vehicle. In this way, the collision energy is absorbed to prevent the steering shaft from moving backward to the chest of the driver.

The known steering shaft having the above structure defines a flat portion for torque transmission to the outer sleeve. The flat portion is formed by cutting a region of the solid round bar remote from the steering wheel. Similarly, two resin filling annular grooves, for example, are cut in the solid bar. In a region adjacent the steering wheel, the solid round bar includes an upper bearing mount, a bearing retaining nut receiving portion, a steering wheel mount, and a retainer nut receiving portion, all cut and arranged in the stated order toward an extreme end of the bar. The steering shaft is manufactured by the further steps of cutting screws in the nut receiving portions, and serrating the steering wheel mount. It is difficult for this steering shaft to be formed lightweight. Moreover, this steering shaft has the disadvantages of requiring a long cutting time, being ill suited for mass production, and involving a high manufacturing cost.

OBJECTS OF THE INVENTION

A primary object of this invention is to provide a steering shaft formed of a plastic metal pipe, which realizes lightweight, a reduced shaping time and low manufacturing cost.

Another object of this invention is to provide a method of manufacturing a steering shaft from a plastic metal pipe, which realizes lightweight, a reduced shaping time and low manufacturing cost.

Other objects of this invention will be apparent from the following description of the preferred embodiment.

DETAILED DESCRIPTION OF THE PREFERRED EMBODIMENT

An embodiment of this invention will be described in detail hereinafter with reference to the drawings.

Figure 1:
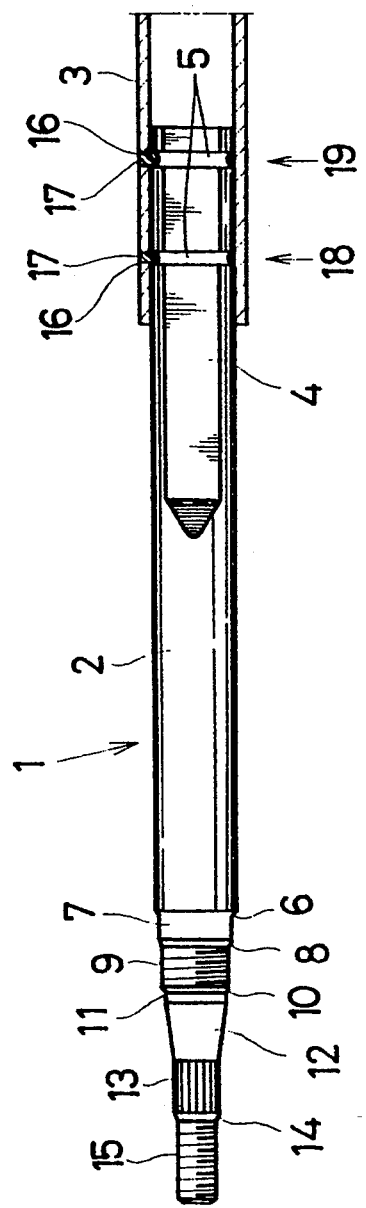
FIG. 1 is a side view partly in section of a steering shaft according to the present invention.

The drawings show a steering shaft and a manufacturing method therefor. In FIG. 1, the steering shaft 1 comprises a plastic metal pipe 2 defining, in a region thereof remote from a steering wheel (right side in FIG. 1), a flat portion 4 for torque transmission to an outer sleeve 3, and two annular grooves 5 to be filled with a synthetic resin. In a region adjacent the steering wheel (left side in FIG. 1), the plastic metal pipe 2 includes a curved portion 6, an upper bearing mount 7, a taper 8, a screw 9 for engaging a bearing retaining nut, a taper 10, a shank 11, a taper 12, a serrated shaft 13 for engaging the steering wheel, a taper 14, and a screw 15 for engaging a retainer nut, which are defined as integral parts thereof and arranged in the stated order toward an extreme end of the pipe 2.

The outer sleeve 3 defines resin injection openings 16 for injecting a synthetic resin 17 to fill spaces defined between the annular grooves 5 and outer sleeve 3. The synthetic resin hardened therein forms energy absorbers 18 and 19 between the steering shaft 1 and outer sleeve 3.

The method of manufacturing the above steering shaft 1 and a die structure used in the manufacture will be described next with reference to FIGS. 2 through 16.

Figure 2:
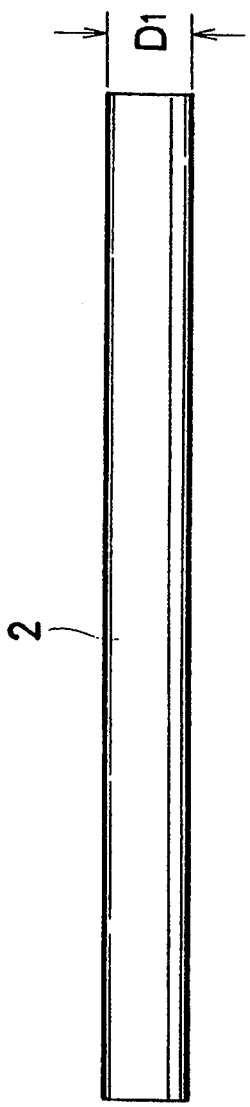
FIG. 2 is a side view of a plastic metal pipe prior to shaping.

FIG. 2 shows a plastic metal pipe 2 which is an unshaped blank having a predetermined length. This pipe 2 has a wall thickness of 2 to 3 mm and an outside diameter D1 of about 22 mm, for example.

Figure 3:
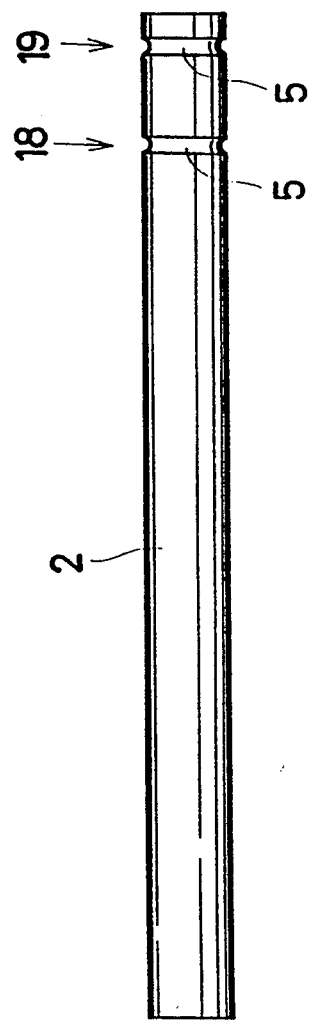
FIG. 3 is an explanatory view of a first manufacturing step.

As shown in FIG. 3, the annular grooves 5 having an outside diameter of 18 to 19 mm are formed in positions of the above plastic metal pipe 2 corresponding to the energy absorbers 18 and 19. This shaping process is carried out by means of roller pressed plastic deformation (first manufacturing step).

As a result of the above roller shaping process, uniform annular gaps of 1.5 to 2 mm are formed through the entire circumference between the outside diameter of pipe 2 and the outside diameter of annular grooves 5.

Figure 4:
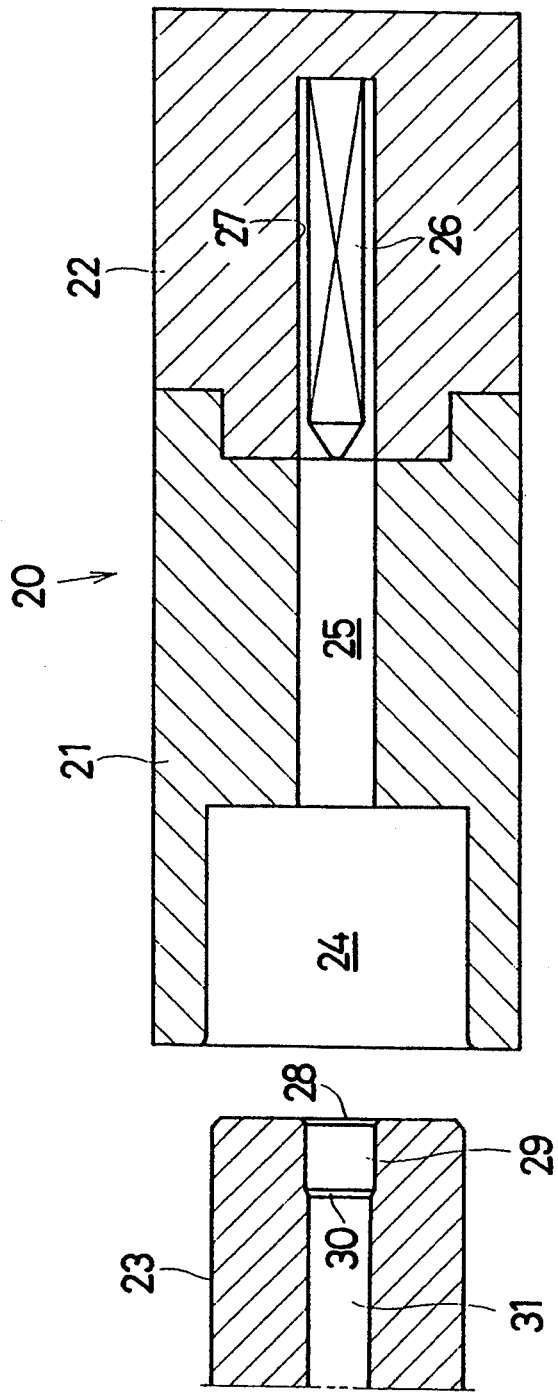
FIG. 4 is a sectional view showing a first movable die and a fixed die in a separated state.
Figure 6:
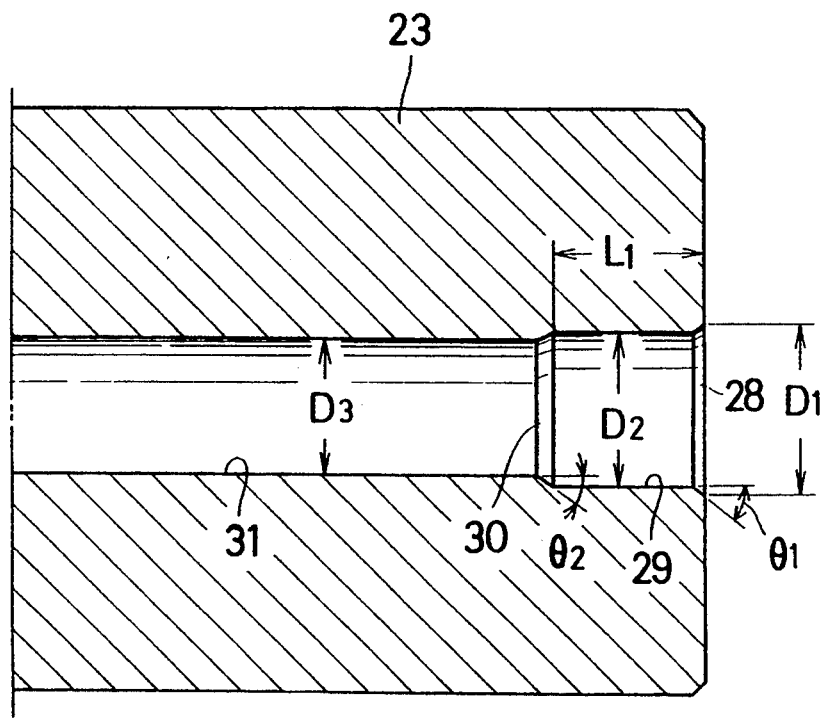
FIG. 6 is an enlarged sectional view of the first movable die.

FIG. 4 shows the die structure in which a fixed die 20 includes a first fixed die 21 and a second fixed die 22 rigidly connected together. The first fixed die 21 defines a recess 24 for guiding a first movable die 23 and other movable dies 37, 51, 65 and 83 to be described later, and a bore 25 for maintaining the outside diameter of the blank pipe 2. The second fixed die 22 defines a form surface 26 at least on one side, preferably on both sides, of a pipe receiving bore 27 for shaping the flat portion 4 in the region of the pipe 2 remote from the steering wheel to be connected to the outer sleeve 3. The pipe receiving bore 27 communicates at one end thereof with the bore 25 of the first fixed die 21, the other end of the pipe receiving bore 27 being a bottomed end. As shown in FIG. 6, the first movable die 23 defines, from a forward end (right end in FIG. 6) inwardly (leftward in FIG. 6), a tapered surface 28 having a predetermined angle $\theta 1$, a cylindrical surface for squeezing the region of the pipe 1 adjacent the steering wheel, a tapered surface 30 having a predetermined angle $\theta 2$, and a cylindrical surface 31 for squeezing the region of the pipe 1 adjacent the steering wheel. The various sections shown in FIG. 6 have the following dimensions and angles, for example:

D1 = 22 mm$\phi$

D2 = 20.1 mm$\phi$

D3 = 18.2 mm$\phi$ $\theta 1$ = 15 degrees $\theta 2$ = 15 degrees

L1 = 21 mm

Thus, the dimensions are set to establish the relational expression D3 < D2 < D1.

Figure 5:
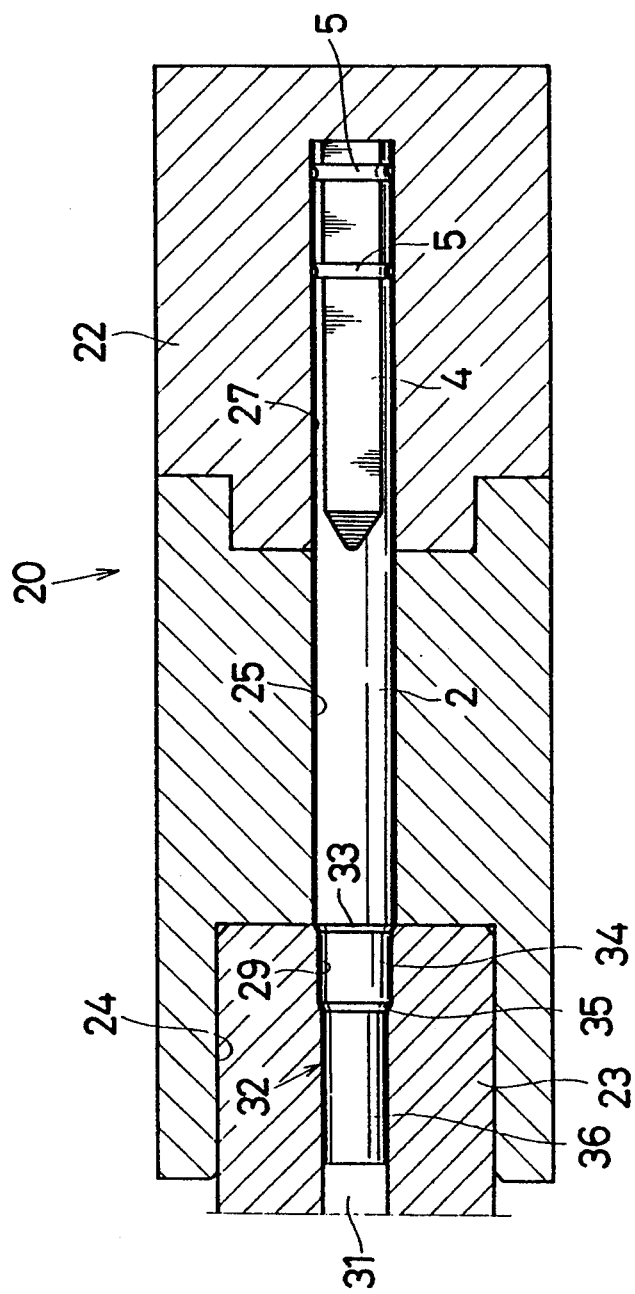
FIG. 5 is an explanatory view of a second manufacturing step.
Figure 7:
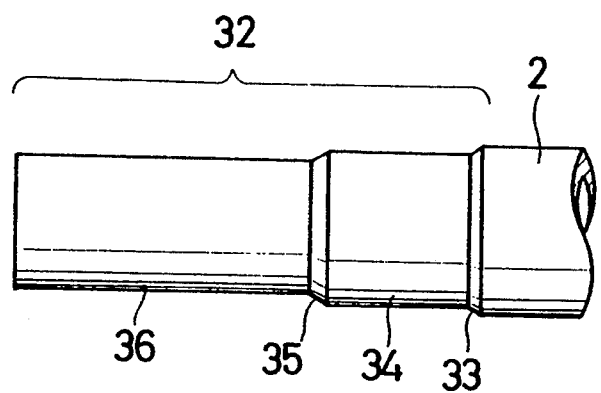
FIG. 7 is an explanatory view of a two-stage shaft portion resulting from the second manufacturing step.

The pipe 2 resulting from the first manufacturing step as shown in FIG. 3 is placed in the fixed die 20 and subjected to press working by the fixed die 20 and first movable die 23. As a result, as shown in FIGS. 5 and 7, the pipe is squeezed at the region thereof remote from the steering wheel to form the flat portion 4, and at the end region adjacent the steering wheel to form a two-stage shaft portion 32 having smaller diameters than the outside diameter of the pipe 2 (second manufacturing step).

The two-stage shaft portion 32 includes a taper 33 having the angle $\theta 1$, a cylindrical portion 34 having the outside diameter D2, a taper 35 having the angle $\theta 2$, and a cylindrical portion 36 having the outside diameter D3.

These sections are arranged in the stated order toward the extreme end to correspond to the form surface structure of the first movable die 23.

Figure 8:
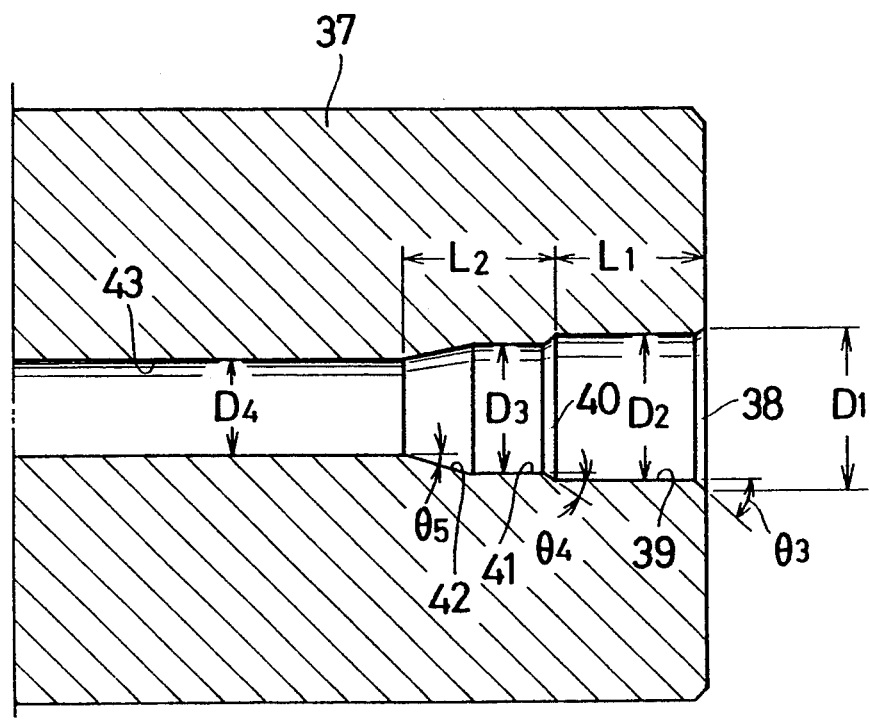
FIG. 8 is a sectional view of a second movable die.
Figure 9:
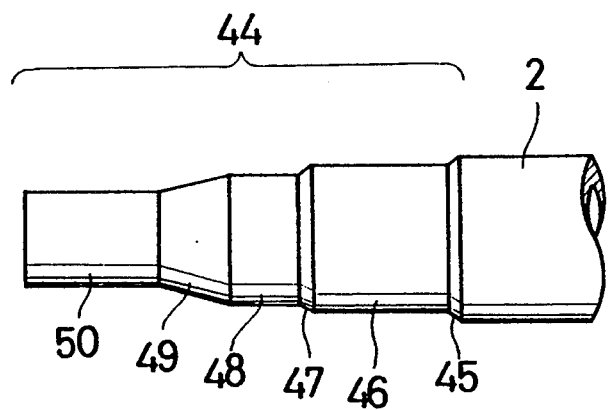
FIG. 9 is an explanatory view of a three-stage shaft portion resulting from a third manufacturing step and having preforming dimensions.

FIG. 8 shows a second movable die 37 for shaping the two-stage shaft portion 32 (FIG. 7) into a three-stage shaft portion 44 having preforming dimensions (FIG. 9). As shown in FIG. 8, the second movable die 37 defines, from a forward end inwardly, a tapered surface 38 having a predetermined angle $\theta 3$, a cylindrical surface 39, a tapered surface 40 having a predetermined angle $\theta 4$, a cylindrical surface 41, a tapered surface 42 having a predetermined angle $\theta 5$, and a cylindrical surface 43 for squeezing the region of the pipe 1 adjacent the steering wheel. The various sections shown in FIG. 8 have the following dimensions and angles, for example:

D1 = 22 mm$\phi$

D2 = 20.1 mm$\phi$

D3 = 18.2 mm$\phi$

D4 = 15.1 mm$\phi$

L1 = 21 mm

L2 = 20 mm $\theta 3$ = 30 degrees $\theta 4$ = 25 degrees $\theta 5$ = 13 degrees Thus, the dimensions and angles are set to establish the relational expressions D4 < D3 < D2 < D1, $\theta 3 > \theta 1$ and $\theta 2$.

The pipe 2 resulting from the second manufacturing step as shown in FIG. 7 is placed in the fixed die 20 (FIG. 4) and subjected to press working by the fixed die 20 and second movable die 37. As a result, the pipe 2 is squeezed to have the three-stage shaft portion 44 having the preforming dimensions shown in FIG. 9 (third manufacturing step).

The three-stage shaft portion 44 includes a taper 45 having the angle $\theta 3$, a cylindrical portion 46 having the outside diameter D2, a taper 47 having the angle $\theta 4$, a cylindrical portion 48 having the outside diameter D3, a taper 49 having the angle $\theta 5$, and a cylindrical portion 50 having the outside diameter D4. These sections are arranged in the stated order toward the extreme end to correspond to the form surface structure of the second movable die 37.

Figure 10:
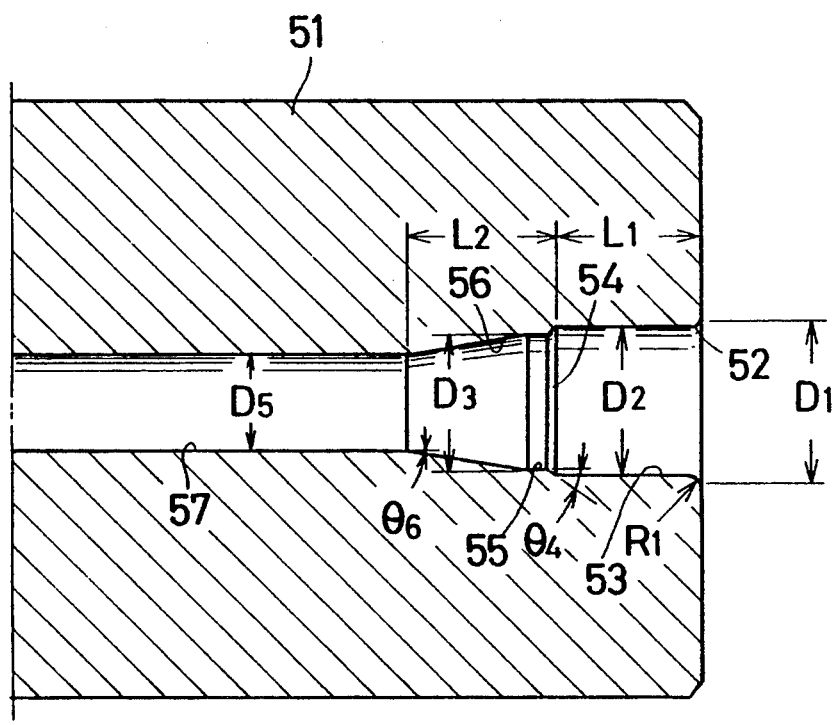
FIG. 10 is a sectional view of a third movable die.
Figure 11:
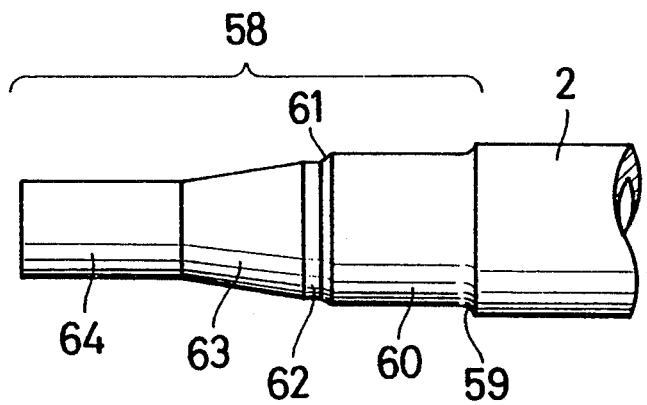
FIG. 11 is an explanatory view of a three-stage shaft portion resulting from a fourth manufacturing step and having intermediate forming dimensions.

FIG. 10 shows a third movable die 51 for shaping the three-stage shaft portion 44 having the preforming dimensions (FIG. 9) into a three-stage shaft portion 58 having intermediate forming dimensions (FIG. 11). The third movable die 51 defines, from a forward end inwardly, a curved surface 52, a cylindrical surface 53, a tapered surface 54 having the predetermined angle $\theta 4$, a cylindrical surface 55, a tapered surface 56 having a predetermined angle $\theta 6$, and a cylindrical surface 57 for squeezing the region of the pipe 1 adjacent the steering wheel. The various sections shown in FIG. 10 have the following dimensions and angles, for example:

D1 = 22 mm$\phi$

D2=20.1 mmφ

D3=18.2 mmφ

D5=14.97 mmφ

L1=21 mm

L2=20 mm

θ4=25 degrees

θ6=7 degrees

R1=1 mm

Thus, the dimensions and angles are set to establish the relational expressions $D5<D3<D2<D1$ and $\theta 6>\theta 5$.

The pipe 2 resulting from the third manufacturing step as shown in FIG. 9 is placed in the fixed die 20 and subjected to press working by the fixed die 20 and third movable die 51. As a result, the pipe 2 is squeezed to have the three-stage shaft 58 having the intermediate forming dimensions shown in FIG. 11 (fourth manufacturing step).

The three-stage shaft portion 58 having the intermediate forming dimensions includes a curved portion 59, a cylindrical portion 60 having the outside diameter D2, a taper 61 having the angle θ4, a cylindrical portion 62 having the outside diameter D3, a taper 63 having the angle θ6, and a cylindrical portion 64 having the outside diameter D5. These sections are arranged in the stated order toward the extreme end to correspond to the form surface structure of the third movable die 51.

Figure 12:
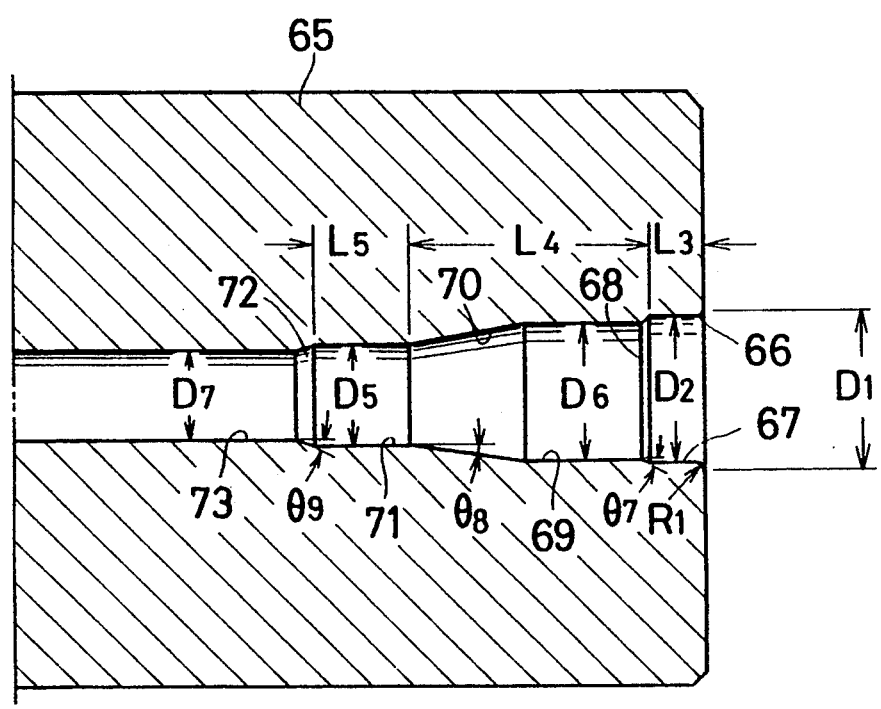
FIG. 12 is a sectional view of a fourth movable die.
Figure 13:
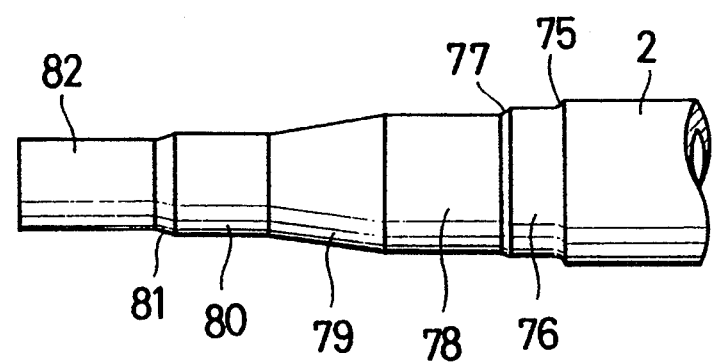
FIG. 13 is an explanatory view of a four-stage shaft portion resulting from a fifth manufacturing step and having dimensions close to final dimensions.

FIG. 12 shows a fourth movable die 65 for shaping the three-stage shaft portion 58 having the intermediate forming dimensions (FIG. 11) into a four-stage shaft portion 74 having dimensions close to final dimensions (FIG. 13). The fourth movable die 65 defines, from a forward end inwardly, a curved surface 66, a cylindrical surface 67, a tapered surface 68 having a predetermined angle θ7, a cylindrical surface 69 for squeezing the region of the pipe 1 adjacent the steering wheel, a tapered surface 70 having a predetermined angle θ8, a cylindrical surface 71, a tapered surface 72 having a predetermined angle θ9, and a cylindrical surface 73 for squeezing the region of the pipe 1 adjacent the steering wheel. The various sections shown in FIG. 12 have the following dimensions and angles, for example:

D1=22 mmφ

D2=20.1 mmφ

D6=19.23 mmφ

D5=14.97 mmφ

D7=12.9 mmφ

L3=8 mm

L4=33 mm

L5=14 mm

R1=1 mm

θ7=15 degrees

θ8=5.7 degrees

θ9=15 degrees

Thus, the dimensions and angles are set to establish the relational expressions $D7<D5<D6<D2<D1$, $\theta 7<\theta 4$ and $\theta 8>\theta 6$.

The pipe 2 resulting from the fourth manufacturing step as shown in FIG. 11 is placed in the fixed die 20 and subjected to press working by the fixed die 20 and fourth movable die 65. As a result, the pipe 2 is squeezed to have the four-stage shaft portion 74 having the dimensions close to final dimensions as shown in FIG. 13 (fifth manufacturing step).

The four-stage shaft portion 74 includes a curved portion 75, a cylindrical portion 76 having the outside diameter D2, a taper 77 having the angle θ7, a cylindrical portion 78 having the outside diameter D6, a taper 79 having the angle θ8, a cylindrical portion 80 having the outside diameter D5, a taper 81 having the angle θ9, and a cylindrical portion 82 having the outside diameter D7. These sections are arranged in the stated order toward the extreme end to correspond to the form surface structure of the fourth movable die 65.

Figure 14:
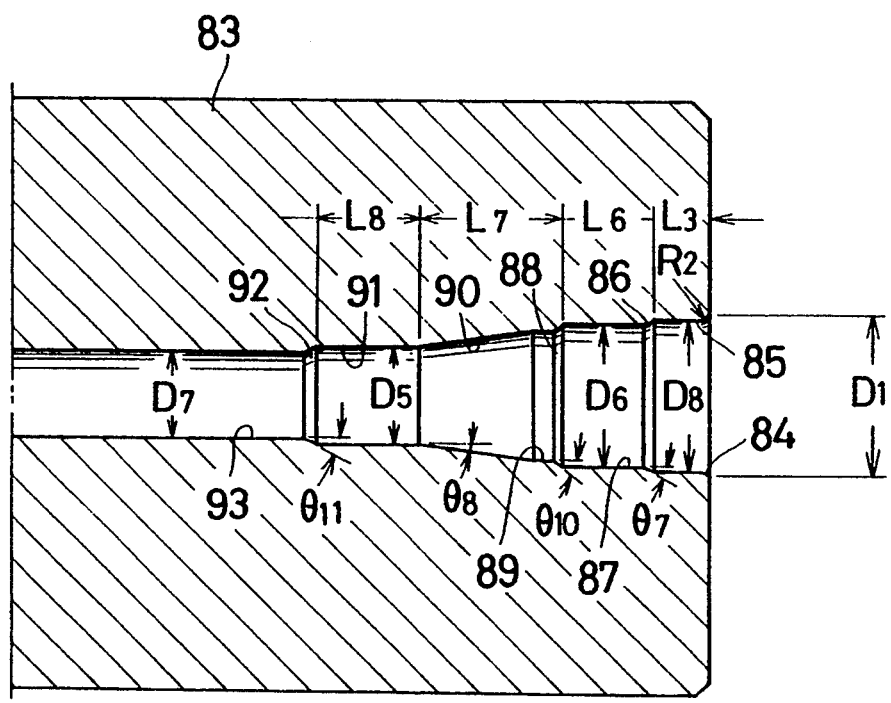
FIG. 14 is a sectional view of a fifth movable die.
Figure 15:
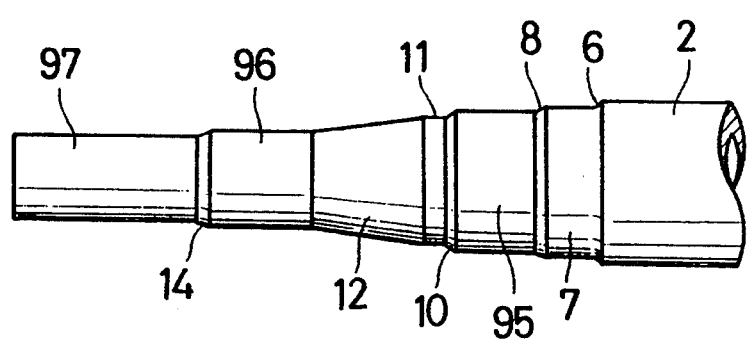
FIG. 15 is an explanatory view of a four-stage shaft portion resulting from a sixth manufacturing step and having final dimensions.
Figure 16:
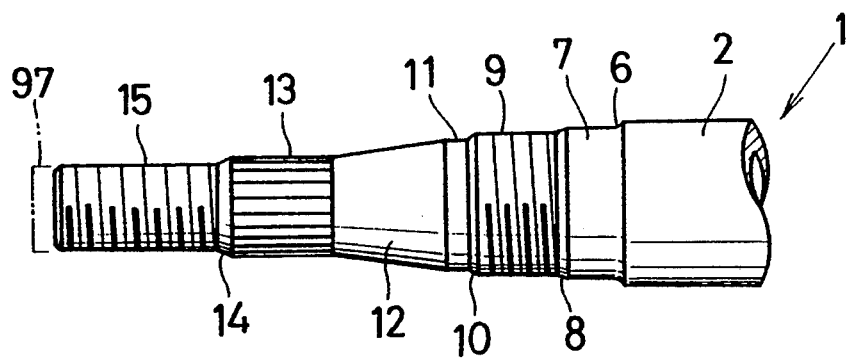
FIG. 16 is an explanatory fragmentary view of the steering shaft resulting from a seventh manufacturing step.

FIG. 14 shows a fifth movable die 83 for shaping the four-stage shaft portion 74 having the dimensions close to final dimensions (FIG. 13) into a four-stage shaft portion 94 having the final dimensions (FIG. 15). The fifth movable die 83 defines, from a forward end inwardly, a curved surface 84, a cylindrical surface 85, a tapered surface 86 having the predetermined angle θ7, a cylindrical surface 87, a tapered surface 88 having a predetermined angle θ10, a cylindrical surface 89, a tapered surface 90 having the predetermined angle θ8, a cylindrical surface 91, a tapered surface 92 having a predetermined angle θ11, and a cylindrical surface 93. The various sections shown in FIG. 14 have the following dimensions and angles, for example:

D1=22 mmφ

D6=19.23 mmφ

D5=14.97 mmφ

D7=12.9 mmφ

L3=8 mm

L6=12 mm

L7=19.65 mm

L8=13.35 mm

R2=0.2 mm

θ7=15 degrees

θ10=25 degrees

θ8=5.7 degrees

θ11=25 degrees

Thus, the dimensions and angles are set to establish the relational expressions $D7<D5<D6<D8$, $D8<D2$ and $R2<R1$.

The pipe 2 resulting from the fifth manufacturing step as shown in FIG. 13 is placed in the fixed die 20 and subjected to press working by the fixed die 20 and fifth movable die 83. As a result, the pipe 2 is squeezed to have the four-stage shaft 94 having the final dimensions shown in FIG. 15 (sixth manufacturing step).

The four-stage shaft portion 94 includes the curved portion 6, the upper bearing mount 7 having the outside dimameter D8, the taper 8 having the angle θ7 a bearing retainer nut receiving portion 95 having the outside diameter D6, the taper 10 having the angle θ10, the shank 11, the taper 12 having the angle θ8, a steering wheel mount 96 having the outside diameter D5, the taper 14 having the angle θ11, and a retainer nut mount 97 having the the outside diameter D7. The above sections are arranged in the stated order toward the extreme end to correspond to the form surface structure of the fifth movable die 83.

Next, the pipe 2 shown in FIG. 15 is withdrawn from the fixed die 20 and fifth movable die 83. An outer end is cut off by a predetermined dimension of about 3 mm at the retainer nut mount 97 as shown in a phantom line in FIG. 16. Thereafter, the bearing retainer nut mount 95 is threaded to form the screw 9 for engaging a bearing retainer nut. Similarly, the retainer nut mount 97 is threaded to form the screw 15 for engaging a retainer nut. The steering wheel mount 96 is serrated to form the serrated shaft 13. Consequently, the steering shaft 1 is completed as shown in solid lines in FIG. 16 and FIG. 1 (seventh manufacturing step).

The steering shaft 1 manufactured as above includes the flat portion 4 for connection, annular grooves 5, upper bearing mount 7, screw 9 for engaging a bearing retaining nut, serrated shaft 13 for engaging the steering wheel, and a screw 15 for engaging a retainer nut, which are formed mainly by press working as integral parts of the steering shaft 1. Compared with a conventional steering shaft formed of a solid round bar, the steering shaft 1 according to this invention has the advantages of being lightweight and manufactured in a reduced shaping time and at low cost.

In the described manufacturing method, the steering shaft 1 is manufactured by successively squeezing the plastic metal pipe 2. Compared with a conventional steering shaft formed of a solid bar, the steering shaft 1 manufactured by the method of this invention is lightweight. As distinct from the conventional manufacturing method mainly comprising cutting processes, the manufacturing method according to this invention mainly comprises press working which provides the advantages of a substantial reduction in the shaping time and low manufacturing cost.

Furthermore, since the steering shaft 1 has a hollow structure, vibrations transmitted from a vehicle body may be absorbed by the hollow and microvibrations of the steering shaft 1 may also be prevented. Being a press worked product, the steering shaft 1 has smooth surfaces and high dimensional precision, and does not require a special finishing treatment after shaping.

What is claimed is:

1. A steering shaft comprising
    an elongated hollow metal pipe (2) press-worked to have a first end and a second end and an outer diameter of about 22 mm and wall thickness of 2 to 3 mm;
    an outer sleeve (3) surrounding said metal pipe at said first end thereof and being coaxial therewith;
    said first end being roll-worked to define a plurality of annular grooves (5) of diameter of 18 to 19 mm and width of 1.5 to 2 mm;
    energy absorbers formed by synthetic resin (17) filled in said annular grooves and in contact with said metal pipe and said outer sleeve;
    said metal pipe being press-worked to define a flat portion (4) connected to said outer sleeve;
    said metal pipe also being press-worked to define in order the following
        a first threaded portion (15) located at said second end of said metal pipe for engaging a retaining nut;
        a first tapered portion (14);
        a serrated portion (13) located adjacent to said first tapered portion for engaging a steering wheel;
        a second tapered portion (12);
        a shank portion (11);
        a third tapered portion (10);
        a second threaded portion (9) located adjacent to said third tapered portion for engaging a bearing nut;
        a fourth tapered portion (8);
        an upper bearing mount (7) located adjacent to said fourth tapered portion; and
        a curved portion (6);
    whereby impact absorption is provided at the first end of said metal pipe of said steering shaft solely by said energy absorbers and shaft connection to said steering wheel is provided by the different portions defined at the second end of said metal pipe.

2. A steering shaft (1) comprising a hollow pipe (2) having an outside diameter, one end of said pipe being attached to a steering wheel and the other end of said pipe having thereon an outer sleeve (3), and energy absorbers (18,19) disposed between said pipe and said outer sleeve, said one end of said pipe having a bearing mount (7), a first nut receiving portion (95), a steering wheel receiving portion (96), and a second nut receiving portion (97); wherein said steering shaft is produced by
    forming annular grooves (5) in said pipe corresponding to locations of said energy absorbers by roll working;
    press working said pipe using a fixed die (2) and a first movable die (23) to form a flat portion (4) toward said other end of said pipe, and to form a two stage shaft portion (32) toward said one end of said pipe, said two stage shaft portion having a smaller diameter than said outside diameter of said pipe;
    press working said pipe using said fixed die and a second movable die (37) to shape said two stage shaft portion into a three stage shaft portion (44) having preforming dimensions smaller than said dimensions of the previous step;
    press working said pipe using said fixed die and a third movable die (51) to shape said three stage shaft portion having preforming dimensions into a three stage shaft portion (58) having intermediate forming dimensions smaller than the dimensions of the previous step;
    press working said pipe using said fixed die and a fourth movable die (65) to shape said three stage shaft portion having said intermediate forming dimensions into a four stage shaft portion (74) having dimensions smaller than the dimensions of the previous step and close to the final dimensions of said bearing mount, said first nut receiving portion, said steering wheel receiving portion, and said second nut receiving portion;

press working said pipe using said fixed die and a fifth movable die (83) to shape said four stage shaft portion having said dimensions close to said final dimensions into a four stage shaft portion (94) having said final dimensions of said bearing mount, said first nut receiving portion, said steering wheel receiving portion, and said second nut receiving portion;

cutting off said one end of said pipe;

forming threads on said first and second nut receiving portions; and serrating said steering wheel receiving portion;

whereby said press working steps use the same fixed die (2) and different movable dies (23,37,51,65,83) in the different steps to form accurately and smoothly the different portions of the pipe forming the bearing mount, first nut receiving portion, the steering wheel receiving portion, and the second nut receiving portion with the desired final dimensions of all portions without any added finishing steps.

* * * * *